(12) United States Patent
Rodriguez et al.

(10) Patent No.: US 8,165,996 B2
(45) Date of Patent: *Apr. 24, 2012

(54) POLICY-BASED MANAGEMENT OF A REDUNDANT ARRAY OF INDEPENDENT NODES

(75) Inventors: Andres Rodriguez, Newton, MA (US); Jack A. Orenstein, Needham, MA (US); David M. Shaw, Newton, MA (US); Benjamin K. D. Bernhard, Arlington, MA (US)

(73) Assignee: Archivas, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,375

(22) Filed: Feb. 1, 2010

(65) Prior Publication Data

US 2010/0138384 A1    Jun. 3, 2010

Related U.S. Application Data

(63) Continuation of application No. 11/638,252, filed on Dec. 13, 2006, now Pat. No. 7,657,586.

(51) Int. Cl.
*G06F 17/30* (2006.01)
(52) U.S. Cl. ............... 707/662; 707/694; 707/609
(58) Field of Classification Search ............... 707/661, 707/690, 662, 694, 609; 709/219, 244; 714/6.12; 711/161
See application file for complete search history.

(56) References Cited

U.S. PATENT DOCUMENTS

| | | | |
|---|---|---|---|
| 7,155,466 B2 * | 12/2006 | Rodriguez et al. | 707/694 |
| 7,580,950 B2 * | 8/2009 | Kavuri et al. | 1/1 |
| 7,657,586 B2 * | 2/2010 | Rodriguez et al. | 707/661 |
| 2005/0195660 A1 * | 9/2005 | Kavuri et al. | 365/189.05 |
| 2007/0103984 A1 * | 5/2007 | Kavuri et al. | 365/185.17 |

OTHER PUBLICATIONS

Baird et al, "Distributed Information Storage Architecture," Twelfth IEEE Symposium on Mass Storage Systems, pp. 145-155, Apr. 26-29, 1993.
Kaczmarski et al, "Beyond Backup Toward Storage Management," IBM Systems Journal, vol. 42, No. 2, pp. 322-337, Jan. 1, 2003.

* cited by examiner

*Primary Examiner* — Jean M Corrielus
(74) *Attorney, Agent, or Firm* — David H. Judson (57) ABSTRACT

An archive cluster application runs in a distributed manner across a redundant array of independent nodes. Each node preferably runs a complete archive cluster application instance. A given nodes provides a data repository, which stores up to a large amount (e.g., a terabyte) of data, while also acting as a portal that enables access to archive files. Each symmetric node has a set of software processes, e.g., a request manager, a storage manager, a metadata manager, and a policy manager. The request manager manages requests to the node for data (i.e., file data), the storage manager manages data read/write functions from a disk associated with the node, and the metadata manager facilitates metadata transactions and recovery across the distributed database. The policy manager implements one or more policies, which are operations that determine the behavior of an "archive object" within the cluster. The archive cluster application provides object-based storage. Preferably, the application permanently associates metadata and policies with the raw archived data, which together comprise an archive object. Object policies govern the object's behavior in the archive. As a result, the archive manages itself independently of client applications, acting automatically to ensure that all object policies are valid.

5 Claims, 5 Drawing Sheets

POLICY-BASED MANAGEMENT OF A REDUNDANT ARRAY OF INDEPENDENT NODES

This application is a continuation of Ser. No. 11/638,252, filed Dec. 13, 2006, now U.S. Pat. No. 7,657,586, which application was based on and claimed priority to Ser. No. 10/974,443, filed Oct. 27, 2004, now U.S. Pat. No. 7,155,466, which application was based on and claimed priority to Ser. No. 60/514,766, filed Oct. 27, 2003.

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Managing technological obsolescence of an archive infrastructure is a key problem in preserving digital content. Given the fast pace of technological change, it is questionable whether the devices that are available today for reading tape or optical disk will still be around in ten years time. Obsolescence occurs at many levels including, without limitation, the file's original format, the application that wrote the file, and the media on which the content was recorded. At first glance, building a large scale archive that keeps pace with the latest technology while also offering online access at a reasonable cost would appear to be impossible. The problem is exacerbated because the archive must handle the complete life cycle of the data it stores. An archive that supports very long retention periods can accumulate a great deal of data over time. Archive systems must therefore be able to grow smoothly, e.g., from a few terabytes to several petabytes, and they must provide high availability, avoid data loss, and be easy to manage.

Prior art techniques do not adequately address these concerns. In particular, it is well-known that setting up large archive systems is error-prone. Databases, networking, operating systems, storage management systems and Web servers all require teams of experts with a myriad of skills to get them running together. In addition, storage systems, databases, Web servers and operating systems all have a vast range of tunable parameters that enable an administrator to optimize performance. Further, serious problems with large-scale infrastructure can take weeks to diagnose and fix. Because archive systems must be continuously available, administrators must be able to remove and replace a faulty device without interrupting ongoing service. Finally, despite the existence of various security mechanisms, administrators are mostly on their own to decide how to protect an archive from malicious attacks or inadvertent damage.

These and other problems are addressed by the present invention.

BRIEF SUMMARY OF THE INVENTION

The present invention provides a low-cost scalable disk based archive storage management system based on the RAIN model. With the present invention, enterprises and organizations can create permanent storage for fixed content information. The system is designed to reduce the complexity of creating and maintaining very large digital archives. It provides for autonomous administration in that the administrator can set and forget policies for day-to-day operations. A rich metadata management layer and a flexible policy processor enable policy-driven administration. By specifying policy rules, archive administrators dictate the behavior of the system and how it manages files. Thus, for example, users can define processes that perform metadata extraction, data encryption, compression, and replication necessary for long-term preservation of valuable data while staying compliant with domain-specific policies.

In one embodiment, the present invention is implemented as a redundant array of independent nodes, which are preferably Linux-based servers. There is no requirement that each machine have the same hardware, however. The nodes support a network-based application that manages archive objects. The system is managed autonomously, i.e., in a manner that is substantially self-controlling and functionally independent of manual intervention. According to a feature of the invention, the system configures itself automatically (or substantially automatically) as specified by high-level policies. This is highly advantageous in the content of long-term management of digital assets because self-configuration, self-healing, and self-optimization are vital to a system that can evolve with new technology.

According to the invention, an archive cluster application runs in a distributed manner across the redundant array of independent nodes. The application enables the archive database to be distributed and replicated across multiple nodes. In the illustrative embodiment, each node preferably runs a complete archive cluster application instance. Each node thus provides a data repository, which stores up to a large amount (e.g., a terabyte) of data, while also acting as a portal that enables access to archive files. Because runtime operations and physical storage of data (and metadata) are distributed among cluster nodes, a high level of reliability and performance are insured even as capacity grows. If a node fails, the cluster adapts by simply redirecting processing to other nodes, so archived data is always available to the archive cluster application.

According to a more specific feature, each node has a same set of software processes, e.g., a request manager, a storage manager, a metadata manager, and a policy manager. Thus, with respect to the archive cluster application itself, each node may be considered symmetric. The request manager manages requests to the node for data (i.e., file data), the storage manager manages data read/write functions from a disk associated with the node, and the metadata manager facilitates metadata transactions and recovery across the distributed database. The policy manager implements one or more policies, which are operations that determine the behavior within the cluster of an "archive object." According to the invention, the archive cluster application provides object-based storage.

Preferably, the application permanently associates metadata and policies with the raw archived data, which together comprise an archive object. Object policies govern the object's behavior in the archive. As a result, the archive manages itself independently of client applications, acting automatically to ensure that all object policies are valid.

In a representative embodiment, fixed content file data is defined atomically when the application writes a source file to a fixed content file system (FCFS). After the file is archived, preferably it cannot be modified. Preferably, the file also cannot be deleted before its retention period expires. Metadata is information that identifies an archive object, such as its author and creation date. According to the invention, metadata also includes policy settings, such as retention period and file protection, that serve as parameters for the archive object's policies. Policies are operations performed by a given policy manager and that determine the archive object's behavior during its life cycle within the archive. Preferably, policies obtain their parameters from the object's metadata. Because each archive object encapsulates its own policies, it is responsible for its own behavior within the archive, e.g., determining whether its content is authentic, or whether its retention period is still in force.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
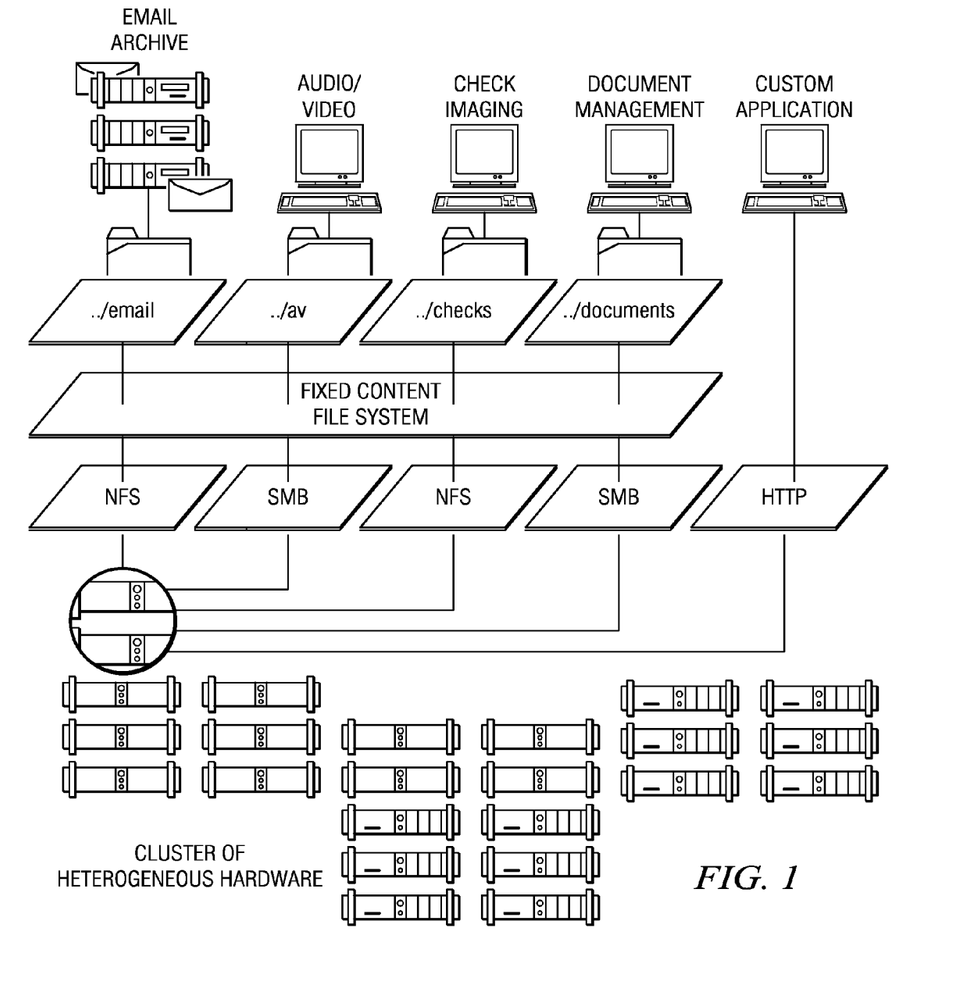
FIG. 1 is a simplified block diagram of a fixed content storage archive in which the present invention may be implemented.

The present invention preferably is implemented in a scalable disk-based archival storage management system, preferably a system architecture based on a redundant array of independent nodes. The nodes may comprise different hardware and thus may be considered "heterogeneous." In contrast, the archive cluster application (and, optionally, the underlying operating system on which that application executes) that is supported on each node is the same. Thus, the software stack (which may include the operating system) on each node is symmetric, whereas the hardware may be heterogeneous. Using the present invention, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

In a representative embodiment, the invention is implemented in a distributed software application that is sometimes referred to as an archive cluster (ArC™) application. The application captures, preserves, manages, and retrieves digital assets. in an illustrated embodiment of FIG. 2, a physical boundary of an individual archive is referred to herein as a cluster. Typically, a cluster is not a single device, but rather a collection of devices. As noted above, devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the duster so that the archive is always protected from device failure. If a disk or node fails, the cluster automatically fails over to other nodes in the cluster that maintain replicas of the same data.

Figures 2, 5:
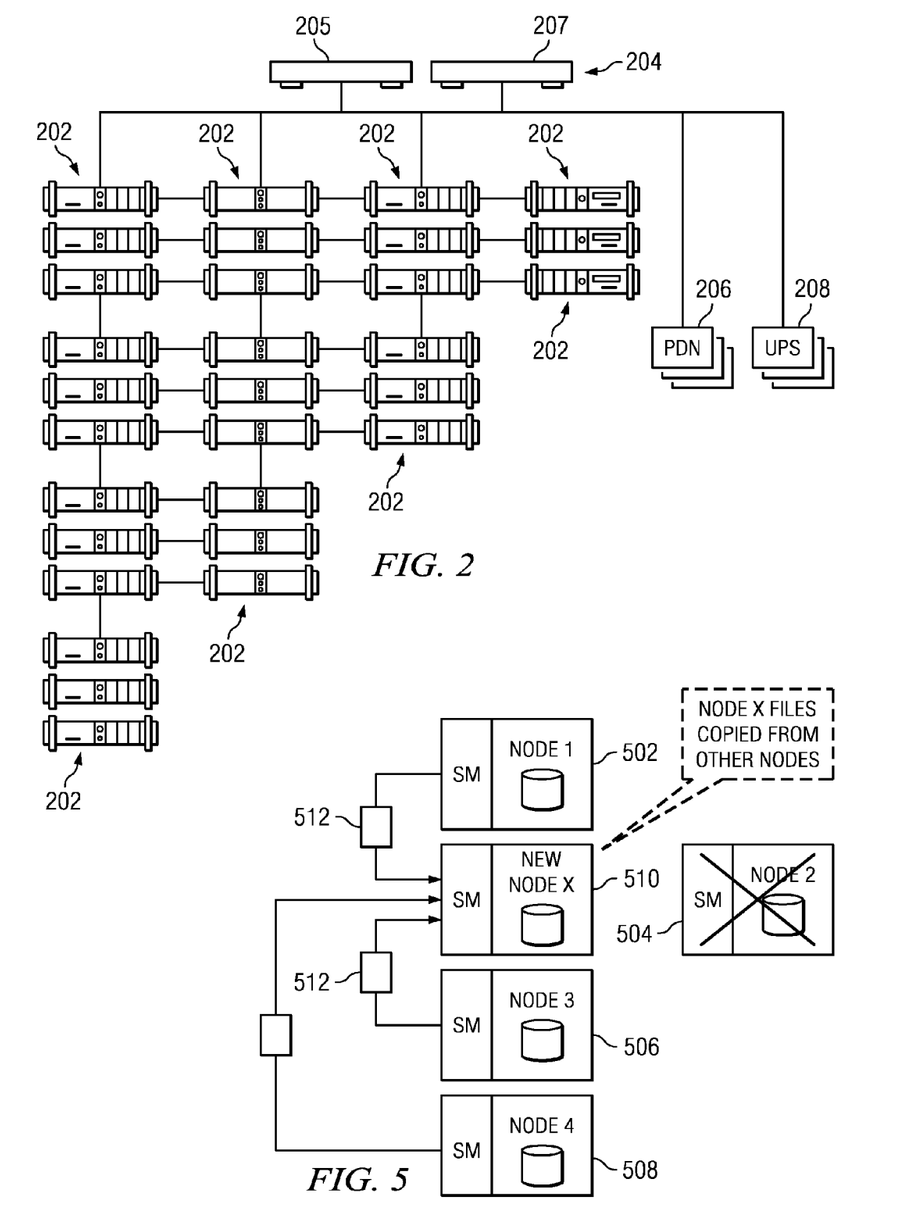
FIG. 2 is a simplified representation of a redundant array of independent nodes each of which is symmetric and supports an archive cluster (ArC) application according to the present invention.
FIG. 5 is a simplified representation of how the cluster is rebalanced when a given node fails.

An illustrative cluster preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

As will be seen below, client applications access the cluster through one or more types of external gateways such as standard UNIX file protocols, or HTTP APIs. Preferably, gateways can be enabled or disabled independently via an administrative console. The archive preferably is exposed through a virtual file system that can optionally sit under any standard UNIX file protocol-oriented facility. These include: NFS, FTP, SMB/CIFS, or the like. Once properly pointed at the archive via a standard TCP/IP address, file protocols behave as they do on any standard UNIX operating system, with "/" being the root directory of the cluster.

In a preferred embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs a full instance 300 of the distributed application, which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

Figure 3:
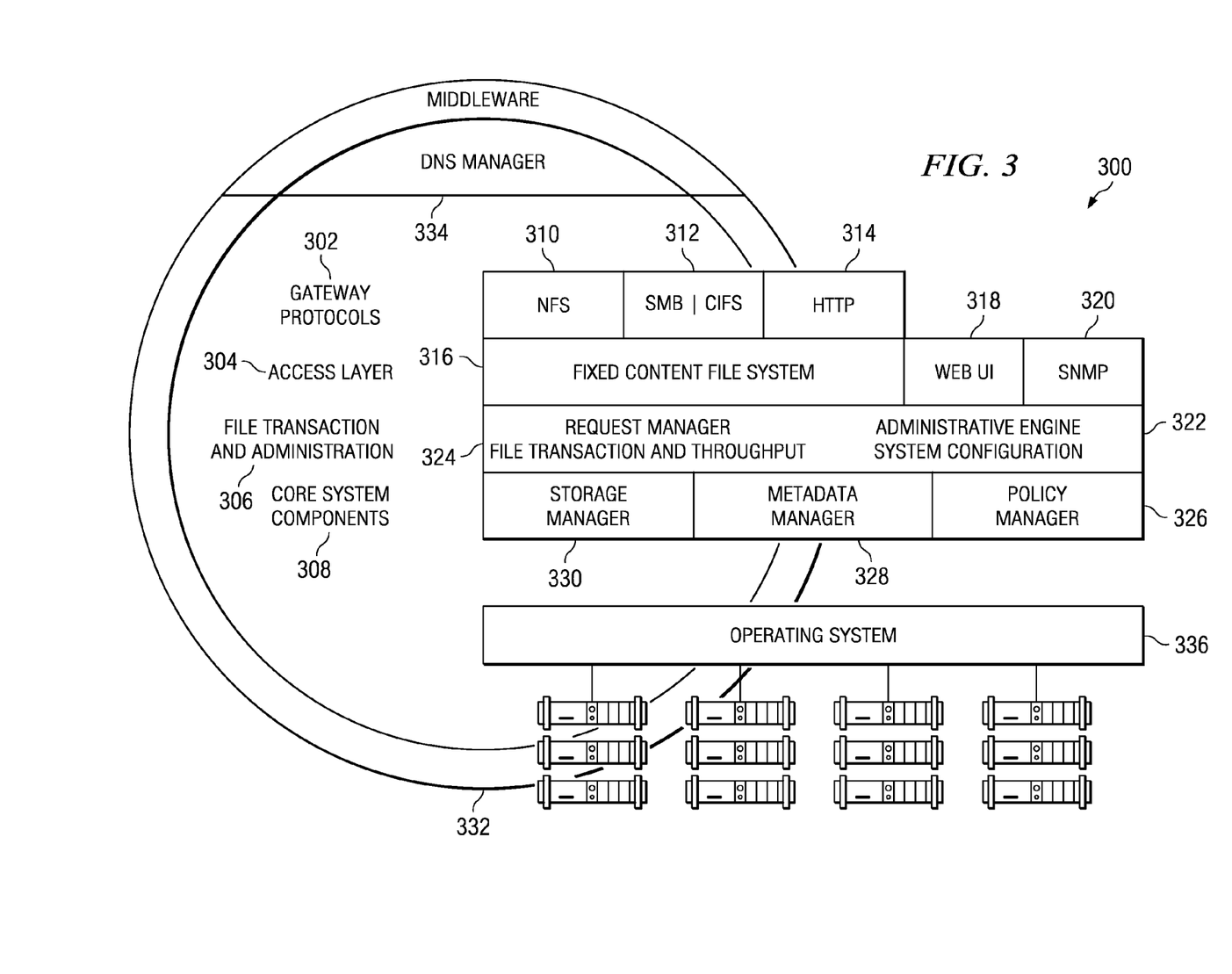
FIG. 3 is a high level representation of the various components of the archive cluster application executing on a given node.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is represented as XML files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. As will be described, FCFS calls preferably are constrained by archive policies to facilitate autonomous archive management according to the present invention. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308. The operation of the policy manager 326 will be described in more detail below.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directly structures.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. The DNS manager preferably load balances requests across all nodes to ensure maximum cluster throughput and availability.

In an illustrated embodiment, the ArC application instance executes on a base operating system 336, such as Red Hat Linux 9.0. The communications middleware may be based on Spread group communications or any other distributed communication mechanism.

As is well-known, Spread is a toolkit that provides a high performance messaging service that is resilient to faults across external or internal networks. Spread functions as a unified message bus for distributed applications, and it provides highly tuned application-level multicast and group communication support. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, PostgreSQL, which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Hash (hash of the internal file at the time of the write (PUT), including a hash type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact. Optimizations can be made by avoiding database lookup for basic parent type information.

As noted above, internal files preferably are the "chunks" of data representing a portion of the original "file" in the archive object, and preferably they are placed on different disks to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

When it store files, the storage manager 330 guarantees that the files were written to the media. The storage manager also responds to requests for various services from the rest of the system. These services and their behavior include: Exists—checks if an internal file exists; Delete—delete an internal file; Wipe—delete and write over an internal file (secure delete); Metadata—get storage manager metadata from an internal file; Hash—return hash of Internal File for an internal file (includes internal file metadata); Listall—return a list of all the Internal Files for this storage manager; and Deleteall—delete all Internal Files on this storage manager.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given cluster may be thought of as being "unreliable," in the sense that it may be unreachable or otherwise unavailable for any reason. A goal of the present invention is to make a collection of such potentially unreliable nodes collaborate to create reliable and highly available storage. Generally, there are two types of information that need to be stored: the files themselves and the metadata about the files.

Figure 4:
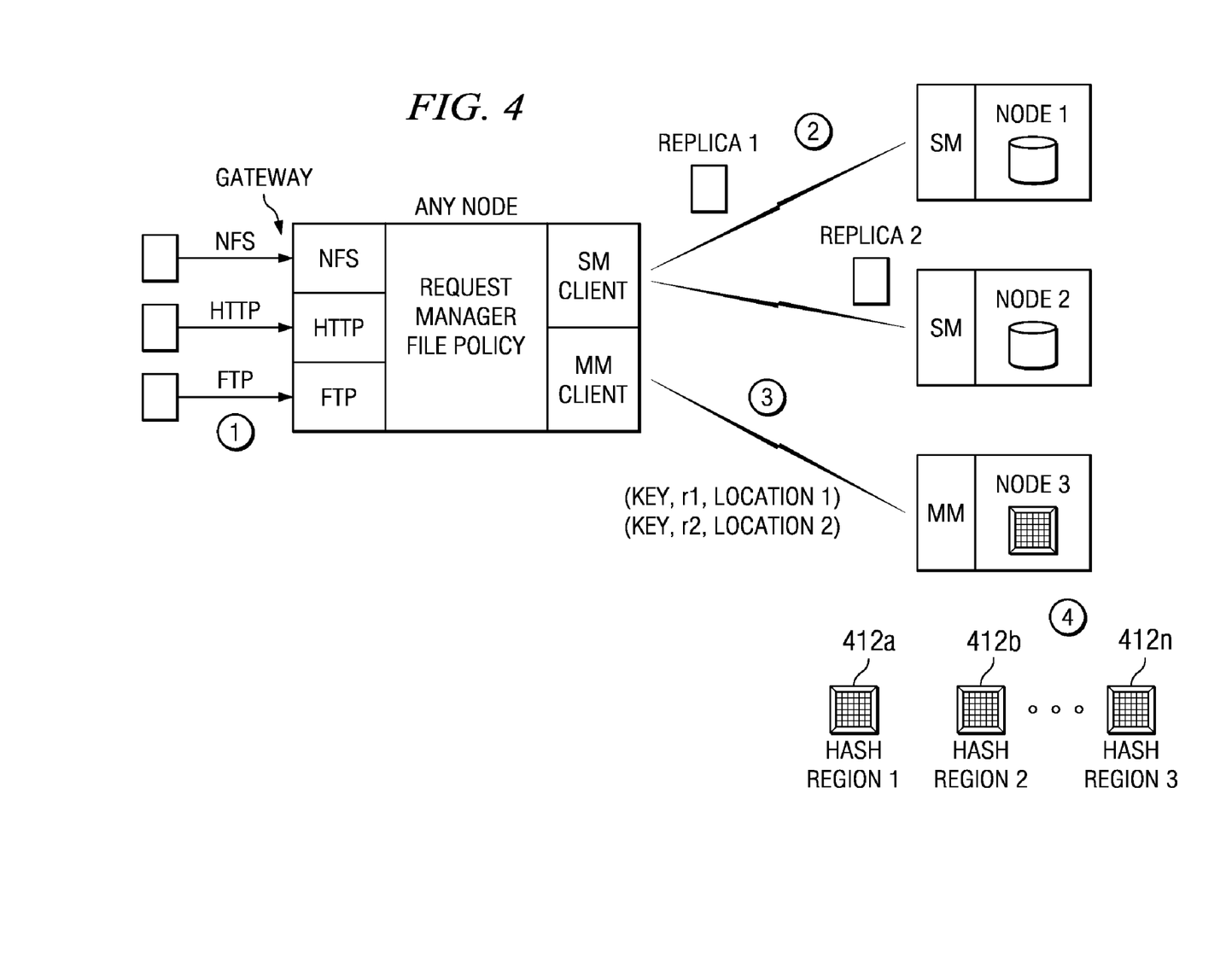
FIG. 4 is a simplified representation of how a given file enters the archive from an external application.

FIG. 4 shows how files enter the system. At step 1, files along with a unique key enter the archive through one of several supported gateways. To protect files, one of several possible schemes may be used as illustrated at step 2: file mirroring, RAID-5 like schemes that spread the file contents across multiple nodes using a recovery stripe to recreate any missing stripes, variations on RAID-5 schemes (such as Rabin information dispersal algorithm or IDA) that use multiple recovery stripes to ensure that simultaneous node failures do not lead to overall system failure. Key value information and other system metadata are written to the metadata manager, as indicated at step 3. The metadata manager then updates its distributed databases as illustrated in step 4. This completes the process.

A highly reliable architecture can serve other purposes. When it is time to upgrade a storage node, the same metadata manager that locates redundant files on other nodes can also be used to populate a new node. This is illustrated generally in FIG. 5, which shows a set of four nodes 502, 504, 506 and 508. As shown in FIG. 5, the metadata manager provides all the information required to rebalance the cluster after Node 2 fails. When new Node 510 is added, the cluster will use this capacity as part of the rebalancing process. A process for determining how and when rebalancing takes place is provided by a rules-driven policy manager. In this scenario, as shown in FIG. 5, the system performs the following steps. The existing node 504 is taken offline. The new node 510 is identified as its replacement. The appropriate metadata manager then identifies files 512 to copy and the location of those files. The request manager then directs files to be copied to the new Node 510. The metadata manager is then updated with the location information.

In general, there may be any given number of metadata managers associated with a given node depending on the amount of metadata and the degree of concurrency required. Each metadata manager is responsible for a subset of the metadata. Preferably, metadata (in the form of metadata objects) are distributed among the metadata managers in the cluster through the use of hashing. Each metadata manager is responsible for one or more ranges 412$a$-$n$ of hash values. Preferably, each metadata object has a name, and the metadata manager responsible for the object is determined by hashing the name into a given hash value. When a given application needs to create, retrieve or update a metadata object, the application hashes the name to determine a hash value, and then the application sends a request to the metadata manager responsible for the range 412 containing the metadata object's hash value. High availability is obtained through the management of metadata updates in a way that permits one metadata manager to rapidly take over responsibility for another's region. When a metadata object is updated, the update is sent to the responsible metadata manager, which applies the update to its local database. Before committing the update, the update is sent to a randomly selected set of other metadata managers. When a metadata manager is unavailable for any reason, another metadata manager can assume control of the affected region and use the backup copies of metadata, scattered throughout the cluster, to handle requests to the region.

An advantage of the RAIN architecture of the present invention is that each node (from a system perspective) need not be identical. Nodes can vary significantly in performance, capacity, and expected reliability. The design of the H-RAIN system presumes a large number of nodes that use commodity hardware. FIG. 1 illustrates an H-RAIN cluster built with heterogeneous hardware components 100$a$-100$n$. Implementation of a given system typically involves several potential strategies. Storage capacity can be increased by adding nodes with the same configuration. It is likely that over time these new nodes will cost less. The average per-gigabyte cost of the archive overall thus diminishes over time. Archive capacity and cost are predictably associated. Storage capacity, performance and reliability can be increased by extending the cluster with new nodes that use superior hardware. The system exploits these new nodes to enhance the archive's performance. For example, new nodes with higher-performance CPUs might be used for CPU-intensive filtering operations. A relatively small amount of new hardware might thereby measurably improve "put" performance. Both strategies allow users to upgrade their technical infrastructure while transparently migrating archive content to more up-to-date nodes. Improvements can be made incrementally, leaving the initial installation intact. If hardware prices fall, users can enhance their archive's performance with the best price performance storage nodes then available. An architecture built on heterogeneous nodes facilitates all of these options. FIG. 5 shows only one scenario for upgrading nodes; other upgrade scenarios are also possible and envisioned by the present invention.

Preferably, adding new nodes preferably is automatic. The system is designed to automate administrative tasks such as upgrading system capacity. For example, after a user adds a new node server to the cluster, the application immediately integrates that node into the overall workflow, without manual intervention. In a representative embodiment, a cluster can contain up to several hundred nodes, although this is not a limitation. By adding nodes to the system, a cluster can eventually scale up to thousands of terabytes.

The application provides protection from data loss. If any node goes out of service, the request manager automatically redirects storage operations to another node. The distributed application always replicates a given node's data elsewhere in the cluster. The archive's failover capabilities ensure a transparent transition from the failed node to another one, so that the failed node's data is always available. As noted above, preferably all files stored in the system are protected by a data protection scheme, which automatically recreates any lost files.

Digital archives present a special kind of data management challenge because they are very large and long-lived. Special attention must be given to the long-term cost of managing these systems. To the degree that archive systems manage themselves and minimize manual intervention, they can yield significant savings. The present invention achieves these goals by having each archive object encapsulate its own policies, which determine the object's behavior during its life cycle in the archive. Thus, each archive object is responsible for its own behavior with the archive. With respect to a given archive object, the archive cluster application supports enforcement of one or more of the following policies: protection, authentication, retention, cluster balance, garbage collection, scavenging, and duplicate elimination. A protection policy protects the integrity of data objects; thus, e.g., initiating repairs after any hardware failure. An authentication policy ensures that the content of a file matches its digital signature. The policy preferably is set to the specific hash algorithm that is used to generate a digital signature. A retention policy prevents deletion of a file before its retention period expires. After the retention period, the data object can be purged either automatically by the application, or explicitly by an archive administrator. A cluster balance policy ensures that data objects are evenly distributed among all nodes in the cluster. A garbage collection policy reclaims disk space by purging files that are left behind by incomplete transactions. It also checks the integrity of system metadata. Preferably, this policy is set to a pick-up time, which specifies how long data must be marked for deletion before it is removed. A scavenging policy ensures against loss of metadata. Internally, the archive's storage manager maintains and manages a data file's content in internal storage files, which also contain the data file's metadata. Internal storage files provide a layer of redundancy that is accessible to the archive's scavenging policy, if necessary. A duplicate elimination policy increases effective cluster capacity by discovering data objects that are the same, and eliminating extra copies.

According to the present invention, a cluster is subject to one or more types of automated policy management: protection, authentication, retention, cluster balance, garbage collection, scavenging, duplicate elimination, and the like. Each of these types is now described in detail. A policy manager executes on each node in the system for this purpose.

Internally, the archive cluster application supports one or more data protection schemes. A representative scheme is a RAID-1 (simple minoring) protection scheme. Another representative scheme is an information dispersal algorithm. From an administrator's perspective, this support preferably is exposed as a single tunable protection parameter for the entire cluster. This is not a limitation of the invention, however. Thus, in a representative embodiment, rather than having to worry about particular protection schemes and their associated parameters, administrators can simply determine the number of tolerable-points-of-failure (TPOF) they wish to support for files. The archive cluster application may support TPOF at a node level, although the application may also be aware of each disk within each node and automatically adjust for both node and disk failures. Given a particular TPOF, the application then takes advantage of the best protection scheme possible (out of those available) given the number of nodes currently within the cluster. Where only RAID-1 data protection is available, even in the simplest case of 2-way mirroring, disk utilization is only 50%. As the number of minors increase, the TPOF increases, but disk utilization decreases. For example: 3-way minoring provides 33% disk utilization, whereas 4-way minoring provides 25% disk utilization. Preferably, a protection policy is set at the cluster level and cannot be overridden at the file level.

In a more specific embodiment, a protection policy is set at the cluster level and cannot be overridden at the file level. The cluster level default can change but is only applied to new files stored in the cluster. In an example, the default TPOF at the cluster level is 1. The protection policy run frequency is configurable. A default run frequency is periodic, such as every 24 hours. In this embodiment, the protection policy on all nodes is automatically initiated if a disk or a node fails anywhere in the cluster.

The policy manager on a given node supports protection as follows. It iterates through all external files (EF) owned by the node it runs on. For each external file, the policy manager iterates through all internal files (IF). It validates that the file an IF points to is reachable and initiates repair as required.

Authentication prevents data corruption and/or sabotage. Thus, the archive cluster application supports an authentication policy where a file being inserted into the cluster is assigned a digital signature. Preferably, the signature is generated from the actual contents of the file, or a portion of the actual contents. The archive periodically checks the authenticity of the stored file's content, for example, by regenerating this signature from the stored content and comparing it to the original signature. The signatures must match to verify data authenticity; otherwise, the archive returns an authentication violation exception to the archive administrator. In an illustrative embodiment, authentication digital signatures are calculated using the MD5 algorithm, although any convenient cryptographic function (e.g., SHA-1, MD4, or the like) may be used. In this illustrated embodiment, a file's MD5 content hash is calculated when it is inserted into the archive. For client applications to verify the content stored in the application is identical to the original, a MD5 hash key can be calculated outside of the cluster and compared with the hash key the cluster maintains. The authentication policy run frequency can be configured. A default run frequency (e.g., every 7 days) is then enforced.

The policy manager on a given node supports authentication as follows. It iterates through all external files (EF) owned by the node it runs on. For each EF, it calculates the MD5 hash key of its content on disk and compares it against the MD5 hash key for the external file stored at initial write time. For each internal file (IF), the policy manager validates the content by comparing an MD5 hash for that internal file stored at initial write time and initial repairs as required. As noted above, the EF hash preferably is derived from the original content. Preferably, the IF hash is derived from the original content together with any scavenging information.

For many data files, corporate and regulatory standards can require retention of data files for varying periods of time. The archive cluster application provides an optional retention period attribute for data files to prevent accidental or malicious deletion of files before their retention periods expire. For example, if a file is stored on Jan. 1, 2004 and has a retention period of 2 months, attempts to delete that file before Mar. 1, 2004 return an error. On or after Mar. 1, 2004, the file is flagged as open for deletion. The file remains in the cluster until explicitly deleted by the archive administrator.

Preferably, retention periods are stored as number of milliseconds. Files can also be marked as never being able to be deleted, e.g., by setting a retention period of −1. For the retention policy, preferably defaults can only be set at the individual directory level but can optionally be overridden for each inserted file when using the HTTP gateway. Once a retention period has been specified for a file, it can be changed (via any of the available gateways), but it can only be increased, not decreased. A default file retention setting for an file is "0" indicating that the file can be deleted at any time. In a representative embodiment, the request manager (RM) on a given node monitors the retention policy. This is not a requirement, however.

Over time, individual nodes within a cluster may become unbalanced in terms of their storage utilization. The archive cluster application monitors this capacity utilization, for example, whenever a new node is added to the cluster, and it relocates files as required to bring the cluster back into a balanced state. Preferably, cluster balance is a cluster level policy that does not have any tunable parameters, although this is not a requirement. While cluster balance is a proactive algorithm to bring a cluster's capacity utilization back into balance, preferably the request manager with a given node attempts to maintain this balance on every write via an intelligent selection of nodes on which to place the data.

Garbage collection is required for the physical deletion of all files marked as logically deleted in the metadata manager. These entries might occur due to a failure during a file write where partially committed components are not automatically cleaned up by the failed write process. Preferably, garbage collection is a cluster level policy that does not have any tunable parameters, although this is not a requirement. The garbage collection policy run frequency is configurable. By way of example, the default run frequency is every 24 hours.

The policy manager in a given node supports garbage collection as follows. It iterates through all metadata owned by the node it runs on. For each external file, the policy manager validates it has all of the associated internal files. The policy manager then cleans up any remnants from failed inserts to these internal files.

Scavenging is a safety net for potential catastrophic loss of metadata. As noted above, each physical file that is stored (by a storage manager) also contains its metadata (normally managed by the metadata manager). The scavenging policy preferably traverses all files to ensure their metadata is intact. If metadata is found to be missing, it will be recreated as required. Preferably, scavenging is a cluster level policy that does not have any tunable parameters, although this is not a requirement. The scavenging policy run frequency is configurable. A default run frequency is every 24 hours.

The policy manager in a given nodes supports scavenging as follows. It iterates through all files owned by storage managers running on the node the policy manager runs on. For each file, the policy manager validates that the cluster has valid metadata for that file. It initiates metadata repair as required.

Figure 6:
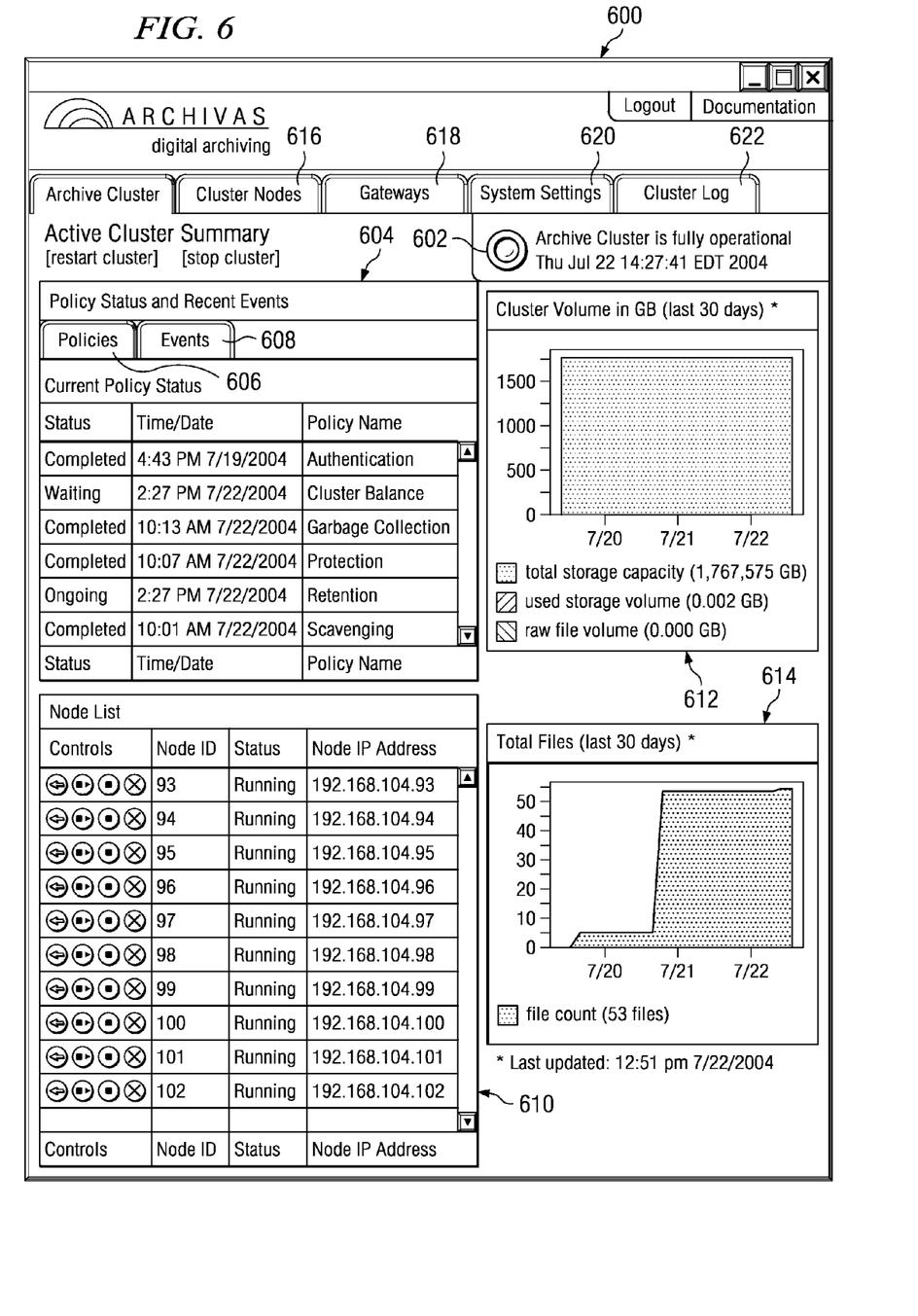
FIG. 6 illustrates a representation archive cluster page available from the administration console on a given node.

As noted above, preferably every node in the archive supports an administration console, which exports a display interface such as shown in FIG. 6. In this example, the archive cluster summary page 600 is shown. This page includes an indicator 602 that indicates that the cluster is fully operational as of a given date and time. This indicator may change color (e.g., from green to yellow to red) depending on current operating conditions. A Policy Status and Recent Events table 604 preferably includes a Policy tab 606 and an Events tab 608. The Current Policy Status for each of the set of supported policies (in this example) is shown. A Node List table 610 identifies each Node by its ID, Status and Node IP Address. A set of Controls are provided to facilitate the management operations. In particular, preferably the administration console exposes a set of cluster/node component controls including: controls for node startup, node shutdown, node restart, cluster startup, cluster shutdown, and cluster restart. One or more cluster metric graphs 612 and 614 are also provided to show (in this example) the Cluster Volume and Total Files supported in the cluster. The administration console may expose any desired cluster metric, of course. By selecting various display tabs, the administrator can also view and set other details. The display tabs include a Cluster Nodes page 616, a Gateways page 618, a System Settings page 620 and a Cluster Log page 622. The Cluster Node page 616 provides settable properties for each Node in the cluster. The Gateway tab 618 displays information about each gateway that is supported. Each gateway has one or more settable properties along with the ability to enable or disable the gateway. The page 618 lists these gateways and their various attributes.

Of course, the display layout in FIG. 6 is merely representative. As noted above, preferably the administration console is a Web based application that resides on every node. As with all other external requests entering the cluster via a gateway, administration console requests are processed on a DNS load balancer-selected node.

The present invention facilitates the provision of an archive management solution that is designed to capture, preserve, manage, and retrieve digital assets. The design addresses numerous requirements: unlimited storage, high reliability, self-management, regulatory compliance, hardware independence, and ease of integration with existing applications.

Clusters of commodity hardware running Linux (for example) according to the present invention provide a robust platform and a virtually unlimited archive. The system can scale, e.g., from a few storage node servers to many nodes that store thousands of terabytes of data. The unique architecture ensures that storage capacity can always keep pace with an organization's increasing archive requirements. The system is designed never to lose a file. It replicates data across the cluster so that the archive is always protected from device failure. If a disk or node fails, the cluster automatically fails over to other nodes in the cluster that maintain replicas of the same data. The present invention reduces the cost of archive storage through autonomous processing. For example, as nodes join or leave the clustered archive, the system automatically adjusts the cluster's load balance and optimizes performance by redistributing files across member nodes.

The present invention can help enterprise with government and industry regulations or the long-term retention of records such as financial documents and medical data. This advantage is provided by implementing write-once-read-many (WORM) guarantees, as well as time-stamping, which facilitates compliance with customer-defined retention policies.

The present invention eliminates hardware dependencies by deploying on an open platform. As the cost gap between commodity platforms and proprietary storage devices grows, information technology (IT) buyers no longer want to be locked into relationships with high-cost appliance vendors. Because a given node typically runs on commodity hardware and preferably open source (e.g., Linux) operating system software, preferably buyers can shop among many hardware options for the best solution.

The present invention offers industry-standard interfaces such as NFS, HTTP, FTP, and CIFS to store and retrieve files. This ensures that the system can easily interface to most standard content management systems, search systems, storage management tools (such as HSM and backup systems), as well as customized archive applications.

By relying on RAIN-based architecture, the system can guarantee reliability to the degree specified by its replication policies. The system is self-healing as files on a failed disk or on a given node are automatically relocated elsewhere. Archives that start small can be easily expanded simply by adding nodes. The highly symmetric design enables the system to distribute processing power and storage capacity across a cluster of many nodes, with little impact on performance.

Creating a large archive typically entails two initial costs: the devices on which the archive runs, and the software that is bundled with it. Both are typically proprietary. The present invention lowers this cost in several ways. The system is designed to work on commodity operating systems and hardware, specifically on clusters of Linux systems in the preferred embodiment. Any computer that runs on supported versions of Linux can act as a system node. By using a hardware-agnostic platform customers are free to seek the best storage cluster components to suit their individual needs. The system is designed to work with a broad array of applications and supports the most popular file level interfaces including, without limitation, NFS, HTTP and FTP. This means that the system can easily be made to work with a broad range of applications.

The present invention provides numerous advantages. As described above, setting up large archive systems is error-prone. Databases, networking, operating systems, storage management systems and Web servers all require teams of experts with a myriad of skills to get them running together. The present invention addresses this problem through an autonomous system that simplifies installation and integration, e.g., by setting system configuration through high-level policies. In addition, it is also known that storage systems, databases, Web servers and operating systems all have a vast range of tunable parameters that enable an administrator to optimize performance. The autonomous system of the present invention performs functions such as load balancing automatically as it monitors its own operation. In the prior art, problems with large-scale infrastructure can take weeks to diagnose and fix. Because archive systems must be continuously available, administrators must be able to remove and replace a faulty device without interrupting ongoing service. An autonomous system such as provided by the present invention automatically detects processes, nodes or other devices that are malfunctioning and safely detaches them from the archive. Finally, despite the existence of various security mechanisms, administrators are mostly on their own to decide how to protect an archive from malicious attacks or inadvertent damage. According to the present invention, in contrast, protection policies that enforce document retention, authentication, and file replication combine to protect an archive from loss of valuable digital assets.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The invention claimed is:

1. Apparatus for use in a redundant array of independent nodes networked together, wherein each node executes an instance of an application that provides object-based storage, comprising:
   a processor;
   computer memory holding computer program instructions that, when executed by the processor, perform a method comprising:
   as given fixed content data is written to a given node, generating a data object that encapsulates the given fixed content data together with metadata that includes policy data;
   storing the data object;
   enforcing a set of policies against the policy data in the data object's metadata during a life cycle of the data object, the set of policies including one of: a data protection policy, an authentication policy, a retention policy, a cluster balance policy, a garbage collection policy, a scavenger policy, and a duplicate elimination policy;
   wherein the policy enforcement for at least one policy for the data object is configurable; and
   displaying a current policy status for each of the set of policies that are being enforced.

2. The apparatus as described in claim 1 wherein the policy enforcement for the at least one policy for the data object is carried out independent of policy enforcement for at least one other data object.

3. The apparatus as described in claim 1 wherein the policy enforcement for the at least one policy for the data object is configured according to a run frequency.

4. The apparatus as described in claim 3 wherein the run frequency has a default value.

5. The apparatus as described in claim 1 wherein the policy enforcement for the at least one policy for the data object is configured according to a tunable parameter.

* * * * *